United States Patent
Klusacek et al.

(10) Patent No.: US 10,724,433 B2
(45) Date of Patent: Jul. 28, 2020

(54) SUPERCHARGER WITH AXIALLY ADJUSTABLE CLEARANCE

(71) Applicant: Bosch Mahle Turbo Systems GmbH & Co. KG, Stuttgart (DE)

(72) Inventors: Michal Klusacek, Prague (CZ); Ruediger Kleinschmidt, Besigheim (DE)

(73) Assignee: BMTS TECHNOLOGY GMBH & CO. KG (DE)

( * ) Notice: Subject to any disclaimer, the term of this patent is extended or adjusted under 35 U.S.C. 154(b) by 295 days.

(21) Appl. No.: 15/849,304

(22) Filed: Dec. 20, 2017

(65) Prior Publication Data
US 2018/0179954 A1 Jun. 28, 2018

(30) Foreign Application Priority Data
Dec. 22, 2016 (DE) .......... 10 2016 226 036

(51) Int. Cl.
*F04D 29/052* (2006.01)
*F02C 6/12* (2006.01)
(Continued)

(52) U.S. Cl.
CPC ............... *F02C 6/12* (2013.01); *F01D 25/16* (2013.01); *F01D 25/162* (2013.01); *F01D 25/18* (2013.01);
(Continued)

(58) Field of Classification Search
CPC ........ F16H 2007/0891; F16C 23/00–10; F16C 25/02; F16C 35/02; F16C 35/10;
(Continued)

(56) References Cited

U.S. PATENT DOCUMENTS 4,573,494 A * 3/1986 Spurbeck .............. F16K 31/523
137/331
4,645,178 A * 2/1987 Martin ................ F15B 13/0444
137/625.65
(Continued)

FOREIGN PATENT DOCUMENTS

CN 205118012 U 3/2016
DE 102007025130 A1 12/2008

OTHER PUBLICATIONS

English abatract for DE-102007025130.

*Primary Examiner* — Charles G Freay
*Assistant Examiner* — Thomas Fink
(74) *Attorney, Agent, or Firm* — Fishman Stewart PLLC

(57) ABSTRACT

A supercharger for a motor vehicle engine may include a bearing device for mounting a shaft in a hub of a bearing housing. The bearing device may be configured to mount the shaft between a turbine wheel and a compressor wheel of the shaft via a bearing bush that may be floatingly mounted to the shaft within the hub in a closely delimited manner relative to the hub and the shaft. The bearing bush may be securely positioned by a pin that engages into the bearing bush radially from the hub. The pin may include a first part rotatably mounted in the bearing housing and a second part engaging in a recess of the bearing bush. An axis of the first part and an axis of the second part may run parallel to one another. The bearing bush and the pin may be connected via a ball joint connection.

20 Claims, 4 Drawing Sheets

(51) Int. Cl.
   *F01D 25/16* (2006.01)
   *F16C 23/10* (2006.01)
   *F16C 17/10* (2006.01)
   *F01D 25/18* (2006.01)
   *F16C 17/02* (2006.01)
   *F16C 33/08* (2006.01)
   *F16C 23/04* (2006.01)

(52) U.S. Cl.
   CPC ............ *F04D 29/052* (2013.01); *F16C 17/02* (2013.01); *F16C 17/10* (2013.01); *F16C 23/043* (2013.01); *F16C 23/10* (2013.01); *F16C 33/08* (2013.01); *F05D 2220/40* (2013.01); *F16C 2360/24* (2013.01)

(58) Field of Classification Search
   CPC ........ F16C 23/02; F16C 23/043; F16C 23/10; F16C 33/08; F16C 17/02; F16C 17/10; F16C 2360/24; F02C 6/12; F02C 7/06; F05D 2220/40; F01D 25/16; F01D 25/162; F04D 29/042; F04D 29/046; F04D 29/052; F04D 29/056
   USPC ...................................................... 74/25–62
   See application file for complete search history.

(56) References Cited

U.S. PATENT DOCUMENTS

| | | | | |
|---|---|---|---|---|
| 4,672,992 | A * | 6/1987 | Vanderlaan | F15B 13/0402 137/331 |
| 4,793,377 | A * | 12/1988 | Haynes | F15B 13/0405 137/331 |
| 5,078,018 | A * | 1/1992 | Saita | B62D 7/1545 180/445 |
| 5,213,000 | A * | 5/1993 | Saya | F16C 17/08 264/262 |
| 5,924,326 | A * | 7/1999 | Fiedler | F16C 25/02 74/400 |
| 2004/0058595 | A1* | 3/2004 | Tornblad | B63H 11/08 440/38 |
| 2008/0047344 | A1* | 2/2008 | Gutknecht | F04D 29/0563 73/462 |
| 2012/0107112 | A1 | 5/2012 | Barlog | |
| 2012/0177314 | A1* | 7/2012 | Mavrosakis | F01D 25/16 384/474 |
| 2018/0023620 | A1* | 1/2018 | Berger | F01D 25/166 384/107 |

* cited by examiner

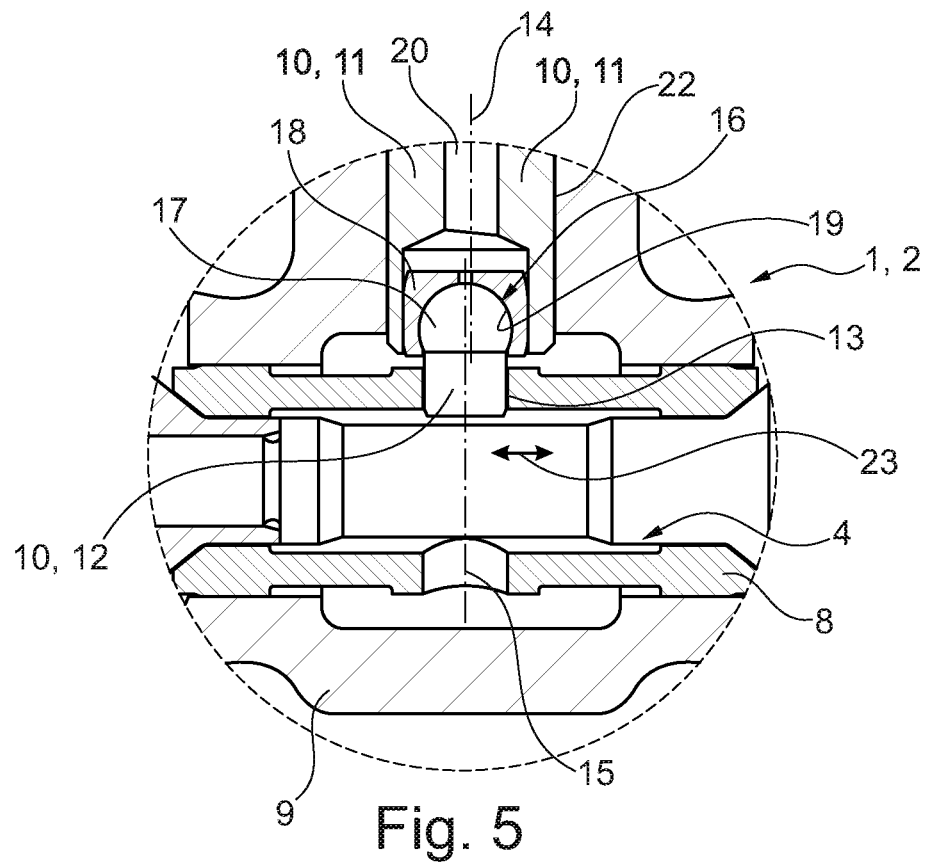
Fig. 5
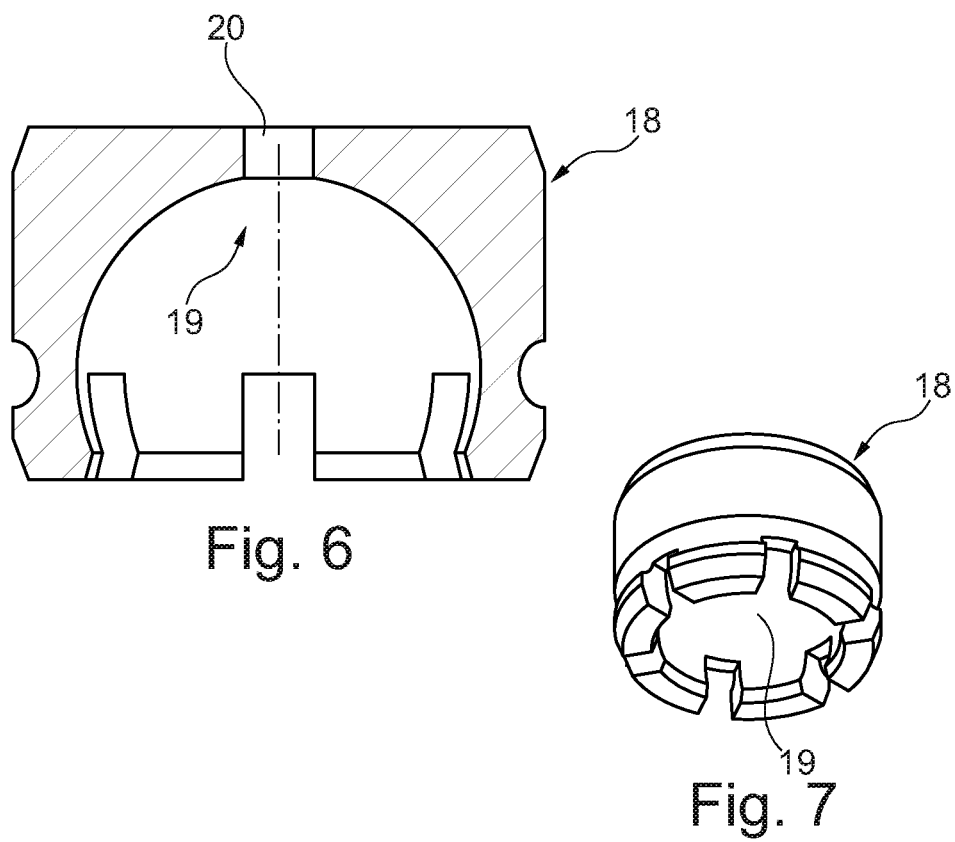
Fig. 6
Fig. 7

SUPERCHARGER WITH AXIALLY ADJUSTABLE CLEARANCE

CROSS-REFERENCE TO RELATED APPLICATIONS

This application claims priority to German Patent Application No. DE 10 2016 226 036.7, filed on Dec. 22, 2016, the contents of which are hereby incorporated by reference in its entirety.

TECHNICAL FIELD

The present invention relates to a supercharger, in particular an exhaust gas turbocharger for a motor vehicle engine.

BACKGROUND

Generally, an axial clearance between compressor blades and a compressor housing has a major influence on a compressor efficiency, it holding true that the smaller this clearance is the greater is the compressor efficiency. When, on the other hand, the supercharger, for example the exhaust gas turbocharger, is operated near the pumping limit, a greater clearance can suppress or diminish the compressor pumping during a sudden load change. The axial compressor clearance in this case results from the following component tolerances: compressor housing, bearing housing, axial position of the rotor carrying the compressor wheel and the turbine wheel relative to the axial bearing. In order to be able to achieve as high as possible a compressor efficiency in this case it is therefore desirable to adjust the axial clearance that exists between compressor blades and compressor housing as small as possible. This is possible for example by way of extremely tight tolerances of the individual components, wherein so-called self-grinding-in compressors are obviously also conceivable, in the case of which Teflon is arranged in the axial clearance of the compressor housing where the compressor blades grind themselves in during the operation of the supercharger and because of this have a comparatively small axial clearance.

A further possibility is for example an axial adjustability of the shaft in the bearing housing and an adjustment of the axial clearance that is possible by way of this, as is described for example in the following prior art.

From DE 10 2007 025 130 A1 a generic supercharger with a bearing device for mounting in a shaft hub formed by a housing of the supercharger or connected to the same in a fixed manner located between turbine and compressor wheel via a bearing bush which is floatingly mounted within said hub in a closely delimited manner relative to the hub and the shaft alike is known, in the case of which a secure positioning of the bearing bush is provided by a pin which radially from the hub engages in the bearing bush. The pin itself is rotatable, at least during the assembly, about a pin or centring axis and serves to thereby make possible an adjustment of the axial position of the bearing bush. To this end, the second part of the pin engaging in the bearing bush is formed eccentrically to a first part of the pin rotatably mounted in the bearing housing of the supercharger, wherein in the bearing bush itself for the engagement of the second part of the pin an elongated hole with adjusting play running in the circumferential direction of the bearing bush is provided.

Disadvantageous with the elongated hole described above however is that the same leads to a point contact between the cylindrical pin and the bearing bush as a result of which a comparatively high wear occurs in the region of the point contact which has a negative effect on the play connected with this. In addition there is the risk that the combination of a circle-cylindrical pin and an associated elongated hole leads to a jamming and/or great wear during the adjusting or during the operation.

SUMMARY

The present invention therefore deals with the problem of stating an improved or at least an alternative embodiment for a supercharger of the generic type which overcomes the disadvantages known from the prior art.

According to the invention, this problem is solved through the subject of the independent Claim(s). Advantageous embodiments are subject of the dependent claims.

The present invention is based on the general idea of realising an axial adjustability of a bearing bush of a supercharger, for example an exhaust gas turbocharger and in addition also an axial adjustability of a rotor carrying a turbine wheel and a compressor wheel by way of a pin which is rotatably arranged with a first part in a bearing housing, which is connected to the bearing bush via a ball joint connection. By way of the ball joint connection in particular a jamming between pin and bearing bush can be excluded just like the point contact between pin and bearing bush which has been critical and susceptible to wear up to now, since by way of the ball joint connection at least a linear contact, preferentially even an areal contact is provided. The supercharger according to the invention, which can be designed for example as exhaust gas turbocharger for a motor vehicle engine, comprises a bearing device for mounting a shaft in a hub formed by a housing of the supercharger or connected to the same in a fixed manner located between turbine and compressor wheel via a bearing bush which is floatingly mounted within said hub in a closely delimited manner relative to the hub and the shaft alike, in which, by way of a pin which radially from the hub engages in the bearing bush, the secure positioning of the bearing bush is provided. According to the invention, this pin now comprises a first part that is rotatably mounted in the bearing housing and a second part which engages in a recess of the bearing bush, wherein an axis of the first part and an axis of the second part run parallel to one another so that the second part is arranged eccentrically relative to the first part. According to the invention, the bearing bush and the pin are connected to one another via a ball joint connection as a result of which—as described above—both a jamming and also the point contact that was susceptible to wear in the past can be avoided. With the supercharger according to the invention it is not only possible to adjust an axial clearance on the compressor side, i.e. between a compressor wheel and a bearing housing or a compressor housing and thereby increase the compressor efficiency, but also to achieve a pumping of the supercharger for example of an exhaust gas turbocharger through reducing an axial clearance between the turbine wheel and a turbine housing, wherein obviously a reduction of a clearance on the compressor side is always accompanied with an enlargement of a clearance on the turbine side or vice versa. Through the possible preventing of the pumping of the exhaust gas turbocharger that is possible with the supercharger according to the invention, it is not only possible to at least reduce negative consequences of a load jump, but in particular also increase the operating range and the efficiency of the compressor.

With an advantageous further development of the solution according to the invention, the first and the second part of the pin are formed in one piece. This represents a particularly cost-effective embodiment of the pin according to the invention, wherein such a pin cannot only be produced cost-effectively but additionally be also assembled in a comparatively simple manner. Thus, in this case, a spherical outer contour, in particular in the manner of a ball head, is provided on the second part of the pin, which interacts with the recess in the bearing bush. By way of the spherical outer contour of the second part of the pin a linear contact with the bearing bush can be achieved wherein the recess in the bearing bush in this case is obviously not in the form of an elongated hole but adapted to an outer contour of the spherical second part of the pin.

Alternatively to this it is conceivable that the first part and the second part of the pin are formed separately from one another, wherein in this case on the second part of the pin a spherical outer contour, in particular in the manner of a ball head, is formed or arranged which interacts with the first part of the pin and wherein the second part of the pin is connected to the bearing bush in a fixed manner. In this case, the ball joint connection is thus not arranged between the bearing bush itself and the second part of the pin but between the first and the second part of the pin, wherein it holds true also for this case that the bearing bush and the pin are connected to one another in an articulated manner via a ball connection located as in this case between the first and the second part of the pin. This constitutes a further possible embodiment, wherein the spherical outer contour, both with the one-piece embodiment of the pin and also with the multi-part embodiment, simultaneously ensures a self-centring of the bearing bush during the assembly. In addition to this, the spherical outer contour makes possible, regardless of the selected embodiment, to achieve minimal tolerances without having to risk a jamming during the adjusting of an axial clearance. Because of the now at least linear contact compared with a point contact, significantly less wear can be additionally expected because of the larger contact area, as a result of which the supercharger has a higher wear resistance per se.

In a further possible embodiment of the solution according to the invention, a bearing shell is arranged between the first and the second part of the pin, which is connected to the first part of the pin in a fixed manner and has an inner contour that is formed complementarily to the spherical outer contour. Here, the inner contour can comprise more than half a sphere, as a result of which the second part of the pin, via the ball joint connection, is not only coupled in an articulated manner to the first part of the pin but simultaneously also retained by the same, since the inner contour on the bearing shell even engages behind the spherical outer contour of the second part of the pin forming a clip-on connection of the same.

In a further advantageous embodiment of the solution according to the invention, the first part and the second part or both parts and the bearing shell comprise an oil passage aperture. In this case it is thus possible via the pin to supply the ball joint connection or the bearing bush with oil thereby lubricating it. The oil passage apertures can be drilled and additionally contribute to a weight reduction.

In a further advantageous embodiment of the solution according to the invention, an electric actuating device for rotating the pin and thereby for adjusting the bearing bush in axial direction is provided. By way of such an electric actuating device, adjusting the axial clearance between the compressor wheel and the compressor housing is thus possible as is a reduction of an axial clearance on the turbine side in order to prevent in particular a pumping of the supercharger. Obviously it is also conceivable that the pin is merely manually rotatable and in addition to this the bearing bush is adjustable in axial direction, which then rather exclusively concerns the assembly.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar or functionally same components.

BRIEF DESCRIPTION OF THE DRAWINGS

It shows, in each case schematically.

DETAILED DESCRIPTION

Figure 1:
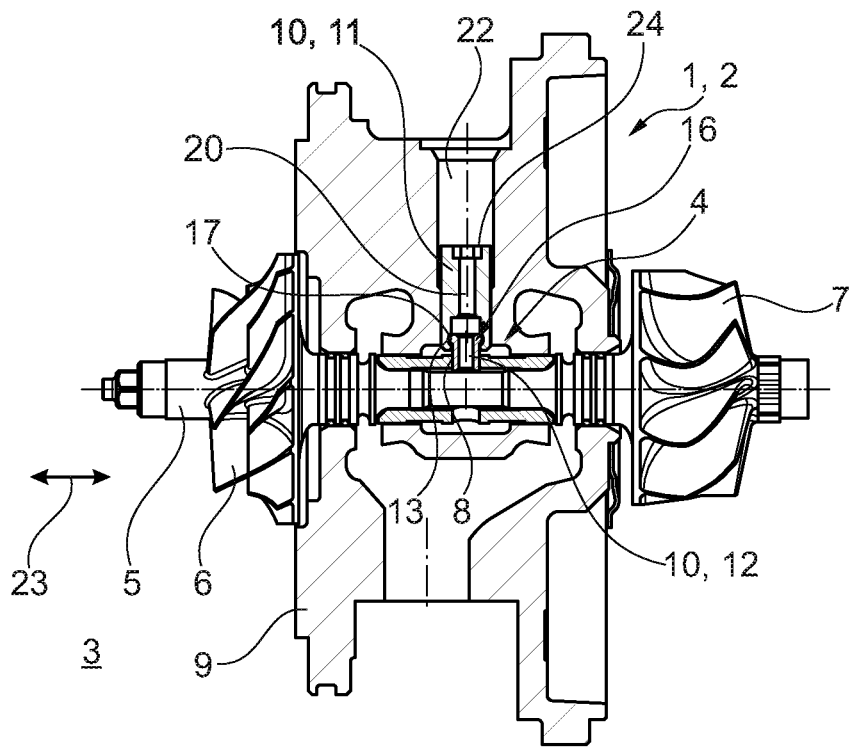
FIG. 1 a sectional representation through a supercharger according to the invention with a pin for the secure positioning of a bearing bush according to a first embodiment, FIG. 2 a representation as in FIG. 1, however with a two-part pin, FIG. 3 a representation as in FIG. 1, i.e. with a one-piece pin, which however is mounted in the bearing housing via a separate bush, FIG. 4 a sectional representation through a further possible embodiment of the supercharger according to the invention, FIGS. 5 and 6 sectional representations through an embodiment with a separate bearing shell, FIG. 7 a view onto the bearing shell, FIG. 8 a further possible embodiment of the supercharger according to the invention with an electric actuating device for rotating the pin and thus for adjusting the bearing bush.

According to FIGS. 1 to 4 and 8, a supercharger 1 according to the invention, which can be designed for example as exhaust gas turbocharger 2 for a motor vehicle engine 3, comprises a bearing device 4 for mounting a shaft 5. Here, the shaft 5 carries a compressor wheel 6 and a turbine wheel 7 and is mounted, via a bearing bush 8, in a bearing housing 9 of the supercharger 1. Here, the bearing bush 8 is floatingly mounted, closely delimited, in a hub of the bearing housing 9, just like the shaft 5 is floatingly mounted, closely delimited, in the bearing bush 8. A secure positioning of the bearing bush 8 in this case is effected by a pin 10 which radially from the hub engages in the bearing bush 8. Here, the pin 10 comprises a first part 11 which is rotatably mounted in the bearing housing 9 and a second part 12 which engages in a recess 13 (see in particular also FIGS. 5 and 8), wherein an axis 14 (see FIG. 5) of the first part 11 runs parallel to an axis 15 of the second part 12 so that the second part 12 upon a rotary movement of the first part 11 is moved on a circular path. The bearing bush 8 and the pin 10 or the parts 11, 12 of the pin are connected to one another in an articulated manner via a ball joint connection 16.

Through the ball joint connection 16, a jamming of the pin 10 relative to the bearing bush 8 can be avoided just like an undesirably high wear, since the ball joint 16 according to the invention brings about a line contact with the interacting parts and because of this is significantly more wear resistant compared with a point contact that occurred in this region up to now.

Figure 4:
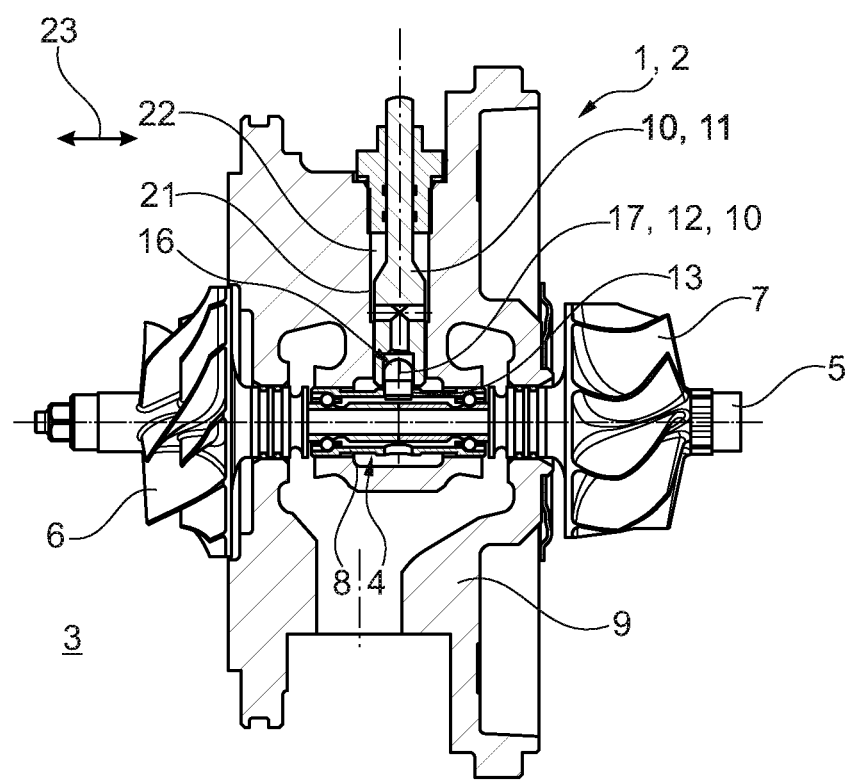
Figure 8:
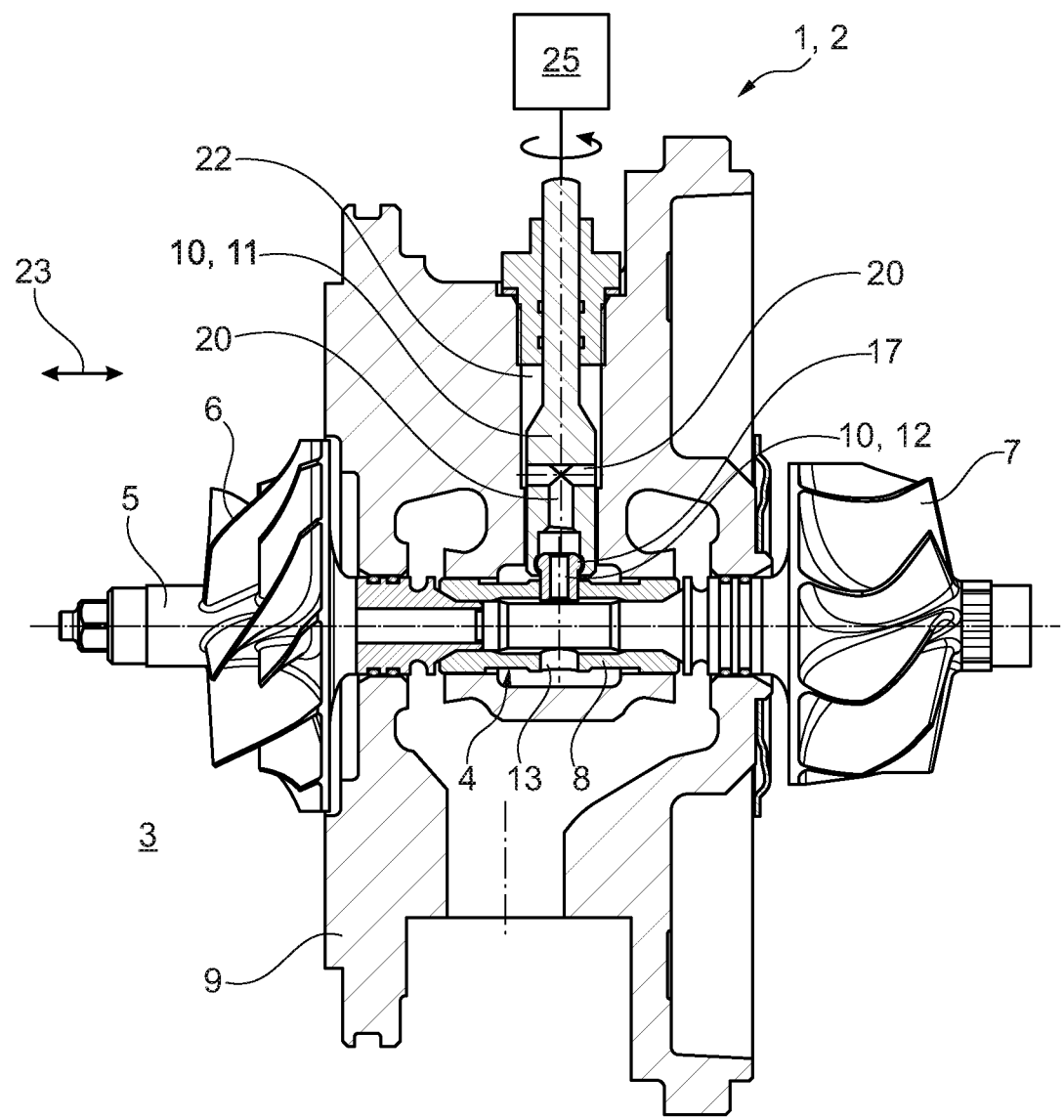

Looking at the superchargers 1 according to FIGS. 1, 4 and 8 it is evident that the first part 11 and the second part 12 of the pin 10 are formed separate from one another so that the pin 10 on the whole is formed in multiple parts. Here, a spherical outer contour 17 is formed on the second part 12 of the pin 10 in each case, in particular in the form of a ball head, which interacts with the first part of the pin 10, wherein the second part 12 is connected to the bearing bush 8 in a fixed manner.

Looking for example at the special embodiment according to FIG. 5 it is evident that between the first part 11 and the second part 12 of the pin 10 a bearing shell 18 is arranged, which is connected to the first part 11 of the pin 10 in a fixed manner and has an inner contour 19 (see in particular also FIGS. 6 and 7) which is formed complementarily to the spherical outer contour 17 on the second part 12 of the pin 10.

Figure 2:
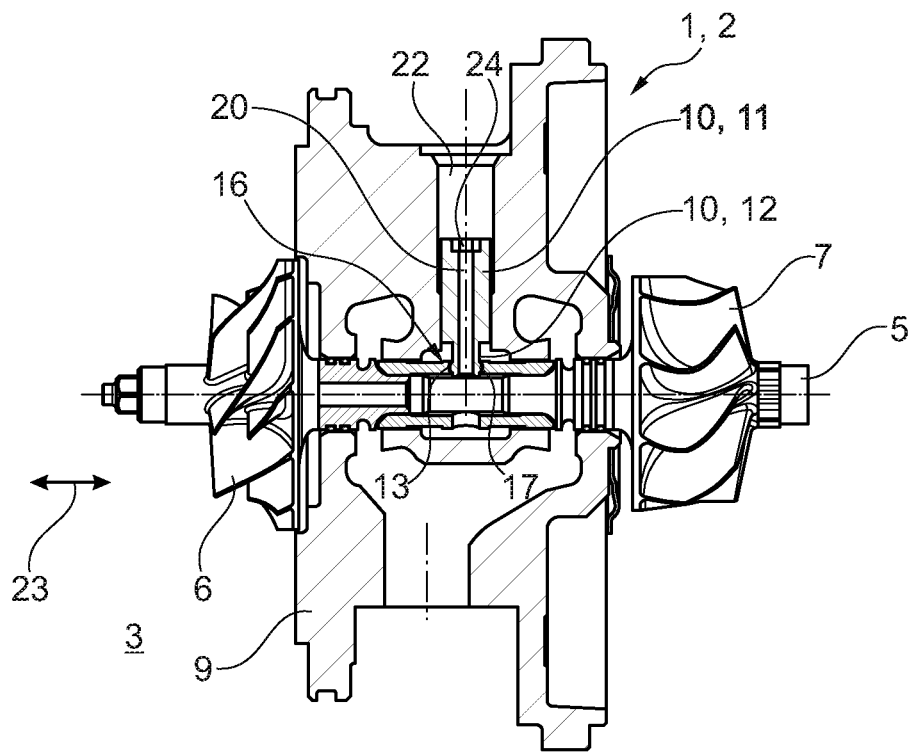
Figure 3:
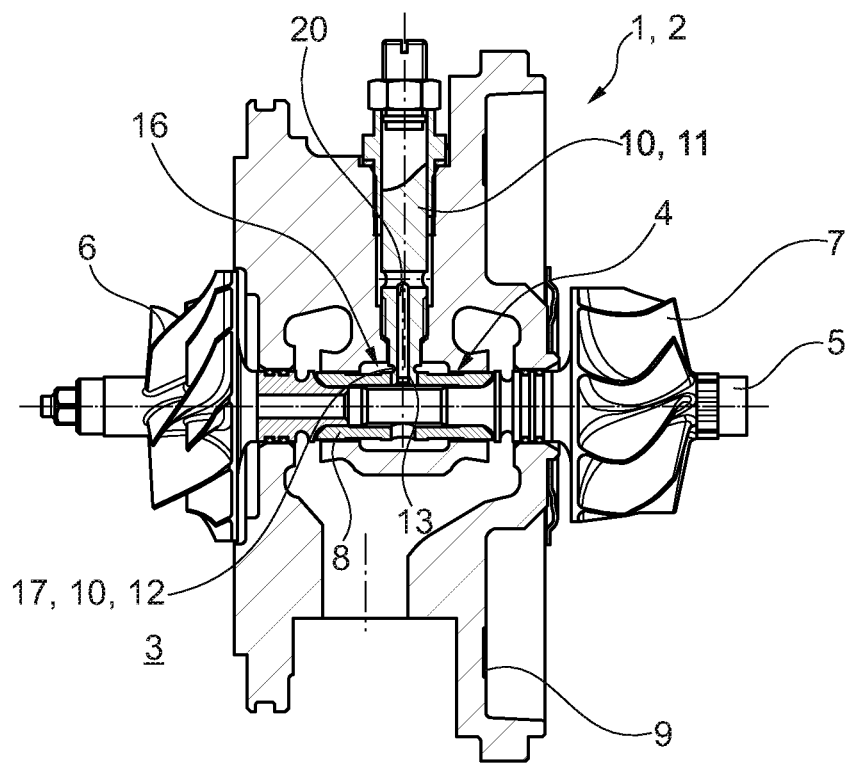

Alternatively to this it is also conceivable that the first part 11 and the second part 12 of the pin 10 are formed in one piece as is shown for example in the case of the pins 10 according to FIGS. 2 and 3. In this case, the previously mentioned spherical outer contour 17 is formed on the second part 12 of the pin 10 in particular in the manner of a ball head which interacts with the recess 13 of the bearing bush 8. By way of the spherical outer contour 17, which engages in the associated recess 13 on the bearing bush 8 in a positively locked manner, a linear contact can be achieved between the same which although poorer than the areal contact with the embodiment of the supercharger according to the invention as per FIGS. 5 to 7, but is significantly better than the merely punctiform contact in the supercharger known from the prior art.

Independently of the embodiment, the first part 11 and the second part 12 or both parts 11, 12 and the bearing shell 18 can include an oil passage aperture 20 for lubrication or oil supply of the bearing bush 8. Purely theoretically, a free space 21 (see FIGS. 3, 4 and 8) between the pin 10 and an aperture 22 in the bearing housing 9 receiving the same can also serve for this purpose.

For adjusting a clearance between the compressor wheel 6 and the bearing housing 9 or between the compressor wheel 6 and a compressor housing which is not shown, the pin 10 can be rotated as a result of which the bearing bush 8 is adjusted in the axial direction 23 and in the process adjusts the shaft 5 in the axial direction by way of suitable ring collars arranged on the shaft 5. Here, both manual adjusting or rotating of the pin 10, for example by inserting a tool in a corresponding engagement contour 24 for example the engaging by means of an Allen key as well as providing an electrical actuating device 25 (see FIG. 8) for rotating the pin 10 and thereby for adjusting the bearing bush 8 in the axial direction 23 is also conceivable. Such an electrical actuating device 25 additionally offers the major advantage that even during the operation of the supercharger 1 an adjusting of an axial clearance between the compressor wheel 6 and the bearing housing 9 or the turbine wheel 7 and the bearing housing 9 or a turbine housing is conceivable, as a result of which a pumping of such a supercharger 1 can also be reliably avoided.

In order to be able to increase the wear resistance of the supercharger 1 as a whole, at least one part of the pin 10 can be formed from ceramic. In order to achieve different-size possibilities of axial adjustment, a parallel offset of the first axis 14 of the first part 11 relative to the axis 15 of the second part 12 can additionally be between 0.001 mm and 5 mm.

With the supercharger 1 according to the invention, the efficiency can be significantly increased and a characteristic diagram range additionally expanded.

The invention claimed is:

1. A supercharger for a motor vehicle engine, comprising a bearing device for mounting a shaft in a hub of a bearing housing, the bearing device configured to mount the shaft between a turbine wheel and a compressor wheel of the shaft via a bearing bush, the bearing bush floatingly mounted to the shaft within the hub in a closely delimited manner relative to the hub and the shaft alike, the bearing bush securely positioned by a pin that engages into the bearing bush radially from the hub, wherein:
   the pin includes a first part rotatably mounted in the bearing housing and a second part engaging in a recess of the bearing bush;
   an axis of the first part and an axis of the second part run parallel to one another; and
   the bearing bush is connected to at least one of the first part and the second part of the pin via a ball joint connection.

2. The supercharger according to claim 1, wherein the first part and the second part are structured as one piece.

3. The supercharger according to claim 2, wherein the second part includes a spherical outer contour that interacts with the recess.

4. The supercharger according to claim 1, wherein the first part and the second part are structured independently of one another.

5. The supercharger according to claim 4, wherein the second part includes a spherical outer contour that interacts with the first part, and wherein the second part is connected to the bearing bush in a fixed manner.

6. The supercharger according to claim 5, further comprising a bearing shell arranged between the first part and the second part, the bearing shell connected to the first part in a fixed manner, wherein the bearing shell includes an inner contour structured complementarily to the spherical outer contour.

7. The supercharger according to claim 1, wherein the first part and the second part include an oil passage aperture.

8. The supercharger according to claim 1, wherein the pin is manually rotatable and the bearing bush is configured to be adjustable in an axial direction upon rotation of the pin.

9. The supercharger according to claim 1, further comprising an electrical actuating device configured to rotate the pin, wherein the bearing bush is configured to be adjustable in an axial direction upon rotation of the pin.

10. The supercharger according to claim 1, wherein at least one of:
    at least one of the first part and the second part is composed of ceramic; and
    a parallel offset of the axis of the first part and the axis of the second part is 0.001 mm to 5 mm.

11. The supercharger according to claim 3, wherein the spherical outer contour is a ball head.

12. The supercharger according to claim 5, wherein the spherical outer contour is a ball head.

13. The supercharger according to claim 6, wherein the first part, the second part, and the bearing shell include an oil passage aperture.

14. A supercharger for a motor vehicle engine, comprising a bearing device for mounting a shaft in a hub of a bearing housing, the bearing device configured to mount the shaft between a turbine wheel and a compressor wheel of the shaft via a bearing bush, the bearing bush floatingly mounted to the shaft within the hub in a closely delimited manner relative to the hub and the shaft alike, the bearing bush securely positioned by a pin that engages into the bearing bush radially from the hub, the pin including a first part rotatably mounted in the bearing housing and a second part engaging in a recess of the bearing bush, an axis of the first part extending parallel to an axis of the second part, wherein:

the bearing bush is configured to be adjustable in an axial direction upon rotation of the pin;

at least one of the first part and the second part are composed of ceramic; and the bearing bush is connected to at least one of the first part and the second part of the pin via a ball joint connection.

15. The supercharger according to claim 14, wherein the first part and the second part are structured as one piece.

16. The supercharger according to claim 15, wherein the second part includes a spherical outer contour that interacts with the recess.

17. The supercharger according to claim 14, wherein the first part and the second part are structured independently of one another.

18. The supercharger according to claim 17, wherein the second part includes a spherical outer contour that interacts with the first part, and wherein the second part is connected to the bearing bush in a fixed manner.

19. The supercharger according to claim 18, further comprising a bearing shell arranged between the first part and the second part, the bearing shell connected to the first part in a fixed manner, wherein the bearing shell includes an inner contour structured complementarily to the spherical outer contour.

20. The supercharger according to claim 19, wherein the inner contour is structured to be larger than half a sphere and configured such that the first part retains the second part when the inner contour engages the spherical outer contour.

* * * * *